United States Patent
Chan

(10) Patent No.: US 12,249,825 B2
(45) Date of Patent: Mar. 11, 2025

(54) POWER SUPPLY DEVICE AND ELECTRONIC DEVICE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 18/498,242

(22) Filed: Oct. 31, 2023

(65) Prior Publication Data

US 2025/0038518 A1    Jan. 30, 2025

(30) Foreign Application Priority Data

Jul. 27, 2023    (TW) ................. 112128093

(51) Int. Cl.
  *H02H 3/24*    (2006.01)
  *H02H 7/12*    (2006.01)
  *H02H 7/125*   (2006.01)
  *H02M 3/335*   (2006.01)

(52) U.S. Cl.
  CPC .......... *H02H 3/24* (2013.01); *H02H 7/125* (2013.01); *H02M 3/33507* (2013.01)

(58) Field of Classification Search
  CPC ...... H02H 3/24; H02H 7/125; H02M 3/33507
  See application file for complete search history.

(56) References Cited

U.S. PATENT DOCUMENTS

| 11,146,167 | B1* | 10/2021 | Aboueldahab | .......... H02M 1/32 |
| 11,777,404 | B1  | 10/2023 | Chan        |                      |
| 2012/0008342 | A1* | 1/2012 | Hsu        | .......... H02M 3/33507 |
|            |     |         |             | 361/18               |
| 2014/0177107 | A1 | 6/2014 | Jang        |                      |

(Continued)

FOREIGN PATENT DOCUMENTS

| CN | 115765422 A  | 3/2023  |
| TW | 202141907 A  | 11/2021 |
| TW | I790937 B    | 1/2023  |

OTHER PUBLICATIONS

Chinese language office action dated Jan. 30, 2024-, issued in application No. TW 112128093.

*Primary Examiner* — Scott Bauer
(74) *Attorney, Agent, or Firm* — McClure, Qualey & Rodack, LLP

(57) ABSTRACT

A power supply device includes a rectifier module, an excitation module, a switch module, a transformer module, a first output module, a second output module, a control module and a logic module. The first and second output modules receive first and second transformed voltages of the transformer module to generate first and second output voltages. The control module determines whether the first output voltage is abnormal according to first and second slopes of the first and second output voltages. When the first output voltage is abnormal, the control module generates a comparison result according to the first slope and a reference slope. The logic module generates a logic signal according to a reference voltage, the first output voltage and the (Continued)

comparison result. The control module controls the power supply device to enter a short current protection or a under voltage protection according to the logic signal.

18 Claims, 6 Drawing Sheets

(56) References Cited

U.S. PATENT DOCUMENTS

| | | | |
|---|---|---|---|
| 2015/0372601 A1* | 12/2015 | Shiu | H02M 1/32 363/21.12 |
| 2018/0115247 A1* | 4/2018 | Schekulin | H02H 7/1213 |
| 2019/0326813 A1* | 10/2019 | Li | H02M 1/4241 |
| 2021/0328502 A1 | 10/2021 | Chen et al. | |
| 2022/0109369 A1* | 4/2022 | Suraci | H02M 1/0032 |

* cited by examiner

POWER SUPPLY DEVICE AND ELECTRONIC DEVICE

CROSS REFERENCE TO RELATED APPLICATIONS

This application claims priority of Taiwan Patent Application No. 112128093, filed on Jul. 27, 2023, the entirety of which is incorporated by reference herein.

BACKGROUND OF THE INVENTION

Field of the Invention

The present invention relates to a power supply device, and in particular it relates to a power supply device and an electronic device.

Description of the Related Art

In general, when a power supply (such as a traditional flyback circuit) encounters a problem with its own circuit or is affected by external system configuration, this results in a lower output voltage, and the power supply needs to initiate protection actions, such as under voltage protection (UVP) or short current protection (SCP). However, since both under voltage and short current may cause the power supply to produce a lower output voltage, the control circuit of the power supply will be unable to determine the type of the abnormal state (whether it is under voltage or short current) and decide what kind of protection (i.e., under voltage protection or short current protection) should be performed. Therefore, how to effectively identify an abnormality in output voltage and to ensure that the power supply device receives the corresponding protection is an area of focus for technical improvements by various manufacturers.

BRIEF SUMMARY OF THE INVENTION

An embodiment of the present invention provides a power supply device and an electronic device, it determines the type of abnormality present in the output voltage, so that the power supply device may enter the corresponding protection mode. This increases the convenience of use.

An embodiment of the present invention provides a power supply device, which includes a rectifier module, an excitation module, a switch module, a transformer module, a first output module, a second output module, a control module and a logic module. The rectifier module is configured to receive an alternating current voltage, and to transform the alternating current voltage into a direct current voltage. The excitation module is coupled to the rectifier module, and configured to receive the direct current voltage to generate an excitation voltage. The switch module is coupled to the excitation module, and configured to determine whether to conduct or not according to a control signal. The transformer module is coupled to the excitation module, and configured to receive the excitation voltage to generate a first transformed voltage and a second transformed voltage. The first output module is coupled to the transformer module, and configured to receive the first transformed voltage to generate a first output voltage. The second output module is coupled to the transformer module, and configured to receive the second transformed voltage to generate a second output voltage. The control module is coupled to the switch module, the first output module and the second output module. The control module is configured to generate a control signal and a reference voltage, receive the first output voltage and the second output voltage, determine whether the first output voltage is abnormal according to a first slope of the first output voltage and a second slope of the second output voltage, and generate a comparison result according to the first slope and a reference slope when determining that the first output voltage is abnormal. The logic module is coupled to the control module and the first output module, and configured to receive the reference voltage, the first output voltage and the comparison result, and generate a logic signal according to the reference voltage, the first output voltage and the comparison result. The control module is configured to control the power supply device to enter a short current protection or a under voltage protection according to the logic signal.

An embodiment of the present invention provides an electronic device, which includes a circuit board and the above power supply device. The circuit board includes a controller. The power supply device is coupled to the circuit board. The power supply device provides the first output voltage to the circuit board for operation of the circuit board. When the control module of the power supply device determines that the first output voltage is abnormal, the control module generates an abnormal signal to the controller. The control module generates a message corresponding to the short current protection or the under voltage protection to the controller according to the logic signal. The reference slope is set or adjusted through the controller.

According to the power supply device and the electronic device disclosed by the present invention, the control module determines whether the first output voltage is abnormal according to the first slope of the first output voltage and the second slope of the second output voltage, and when the first output voltage is abnormal, the control module generates the comparison result according to the first slope of the first output voltage and the reference slope. Then, the logic module generates the logic signal according to the first output voltage, the reference voltage and the comparison result. Afterward, the control module controls the power supply device to enter the short current protection or the under voltage protection according to the logic signal. Therefore, it may effectively determine the type of abnormality (short current or under voltage) present in the first output voltage, so that the power supply device may enter the corresponding protection mode (short current protection or under voltage protection). This increases the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

It should be understood that the terms such as "including" and "comprising" used in the specification are used to indicate the existence of specific technical features, numerical values, method steps, working processes, elements and/or components, but do not exclude the possibility of adding further technical features, numerical values, method steps, working processes, elements, components, or any combination of the above.

Terms such as "first" and "second" are used to modify components, and they are not used to indicate the priority or precedence relationship between them, but are only used to distinguish components with the same name.

In each of the following embodiments, the same reference number represents an element or component that is the same or similar.

Figure 1:
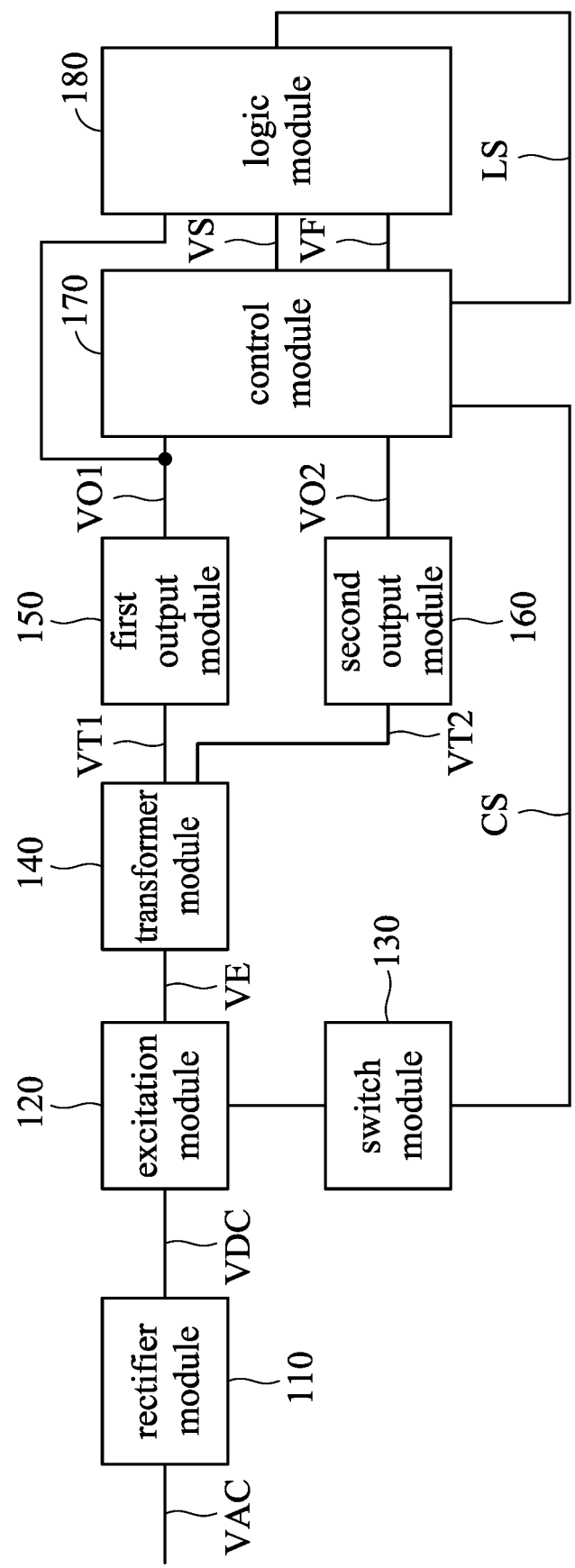
FIG. 1 is a schematic view of a power supply device according an embodiment of the present invention.

FIG. 1 is a schematic view of a power supply device according an embodiment of the present invention. Please refer to FIG. 1. The power supply device 100 includes a rectifier module 110, an excitation module 120, a switch module 130, a transformer module 140, a first output module 150, a second output module 160, a control module 170 and a logic module 180.

The rectifier module 110 receives an alternating current voltage VAC, and transforms the alternating current voltage VAC into a direct current voltage VDC. In the embodiment, the rectifier module 110 may include a bridge rectifier, such as a full-bridge rectifier, but the embodiment of the present invention is not limited thereto. The excitation module 120 is coupled to the rectifier module 110. The excitation module 120 receives the direct current voltage VDC to generate an excitation voltage VE.

The switch module 130 is coupled to the excitation module 120. The switch module 130 determines whether to conduct or not according to a control signal CS. In the embodiment, the control signal CS may be a pulse width modulation signal, but the embodiment of the present invention is not limited thereto. For example, when the control signal CS is, for example, at a high logic level, the switch module 130 is conducted. When the control signal CS is, for example, at a low logic lever, the switch module 130 is not conducted.

The transformer module 140 is coupled to the excitation module 120. The transformer module 140 receives the excitation voltage VE to generate a first transformed voltage VT1 and a second transformed voltage VT2. The first output module 150 is coupled to the transformer module 140. The first output module 150 receives the first transformed voltage VT1 to generate a first output voltage VO1. The second output module 160 is coupled to the transformer module 140. The second output module 160 receives the second transformed voltage VT2 to generate a second output voltage VO2.

The control module 170 is coupled to the switch module 130, the first output module 150 and the second output module 160. The control module 170 generates the control signal CS and a reference voltage VF. In the embodiment, the reference voltage VF is, for example, a voltage with a high voltage level, but the embodiment of the present invention is not limited thereto.

In addition, the control module 170 receives the first output voltage VO1 and the second output voltage VO2, and determines the first output voltage VO1 is abnormal according to a first slope of the first output voltage VO1 and a second slope of the second output voltage VO2. When determining that the first output voltage VO1 is abnormal, the control module 170 generates a comparison result according to the first slope of the first output voltage VO1 and a reference slope.

Figure 2:
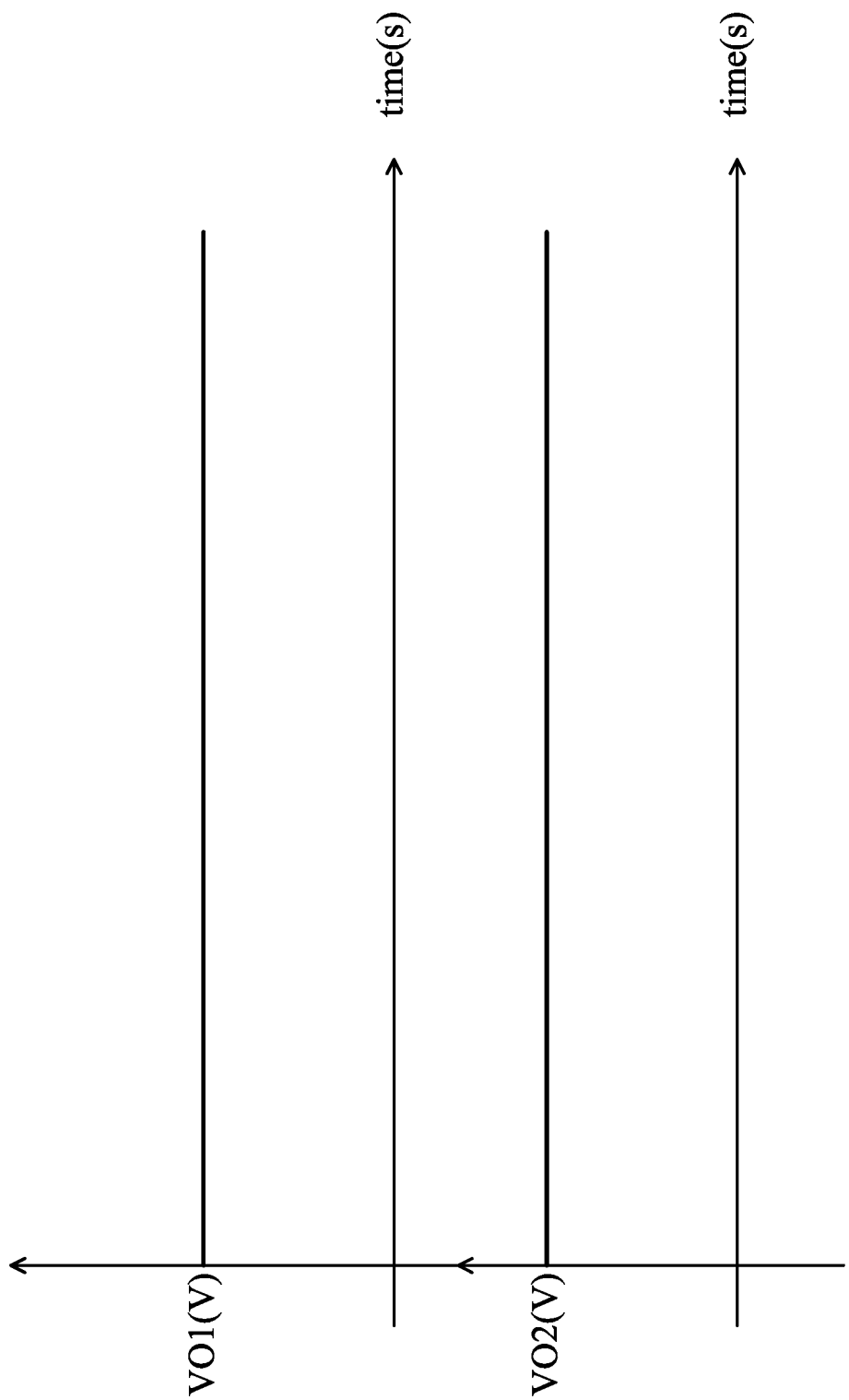
FIG. 2 is a waveform diagram of a first output voltage and a second output voltage according an embodiment of the present invention.

In some embodiments, after the control module 170 obtains the first slope of the first output voltage VO1 and the second slope of the second output voltage VO2, the control module 170 may determine whether the first slope of the first output voltage VO1 is the same as the second slope of the second output voltage VO2 to determine whether the first output voltage VO1 is abnormal. As shown in FIG. 2, when determining that the first slope of the first output voltage VO1 is the same as the second slope of the second output voltage VO2, the control module 170 may determine that the first output voltage VO1 is not abnormal, and the control module 170 does not generate the comparison result VS. That is, the pin of the control module 170 used to generate the comparison result VS is in a "floating" state.

On the other hand, when determining that the first slope of the first output voltage VO1 is not the same as the second slope of the second output voltage VO2, the control module 170 may determine that the first output voltage VO1 is abnormal. Then, the control module 170 may further obtain the reference slope, and determine whether the first slope of the first output voltage VO1 is greater than or less than the reference slope. Furthermore, the control module 170 may obtain the absolute value of the first slope of the first output voltage VO1 and the absolute value of the reference slope, and determine whether the absolute value of the first slope is less than or greater than the absolute value of the reference slope.

Figure 3:
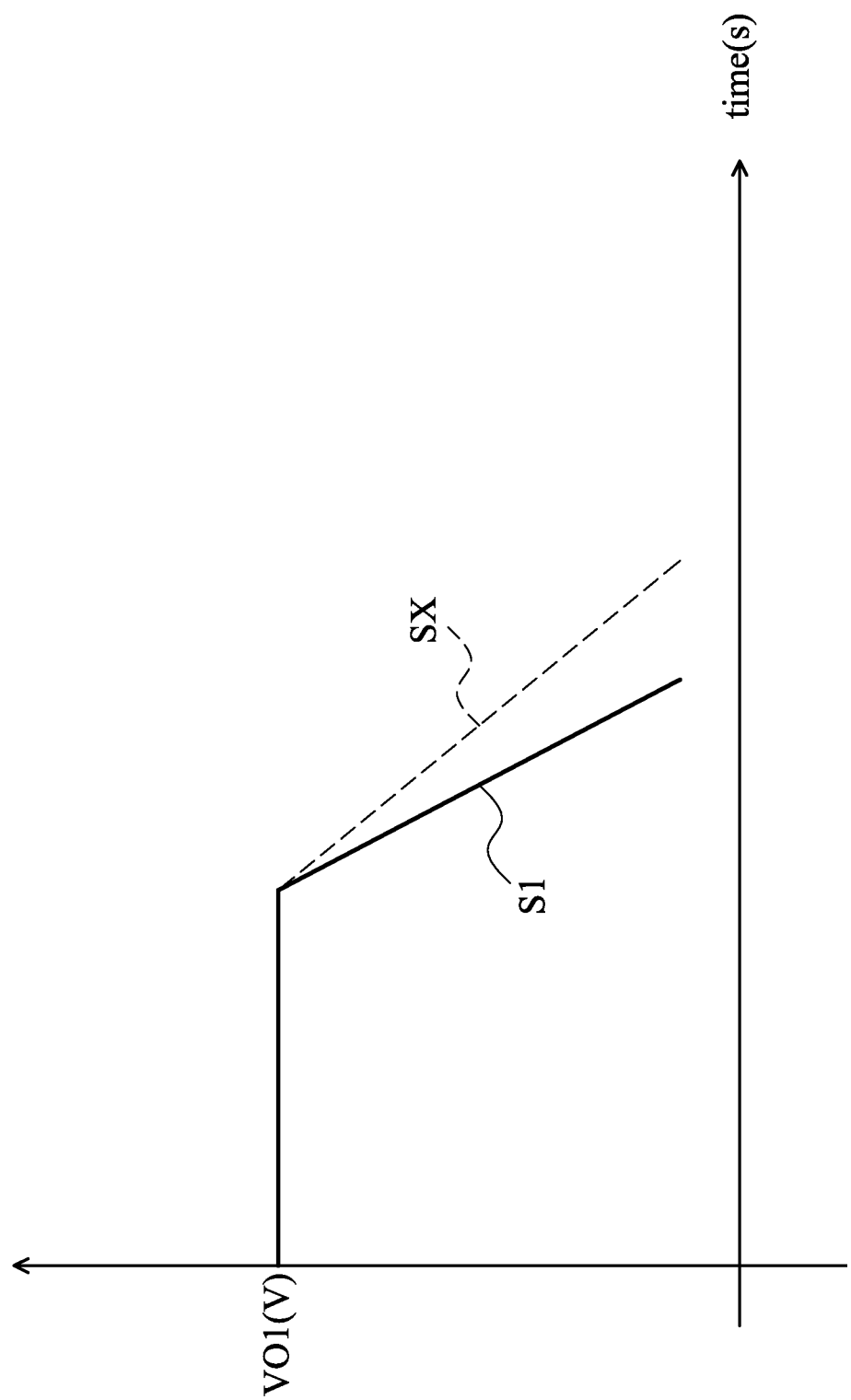
FIG. 3 is a waveform diagram of a first slope of a first output voltage and a reference slope according an embodiment of the present invention.
Figure 4:
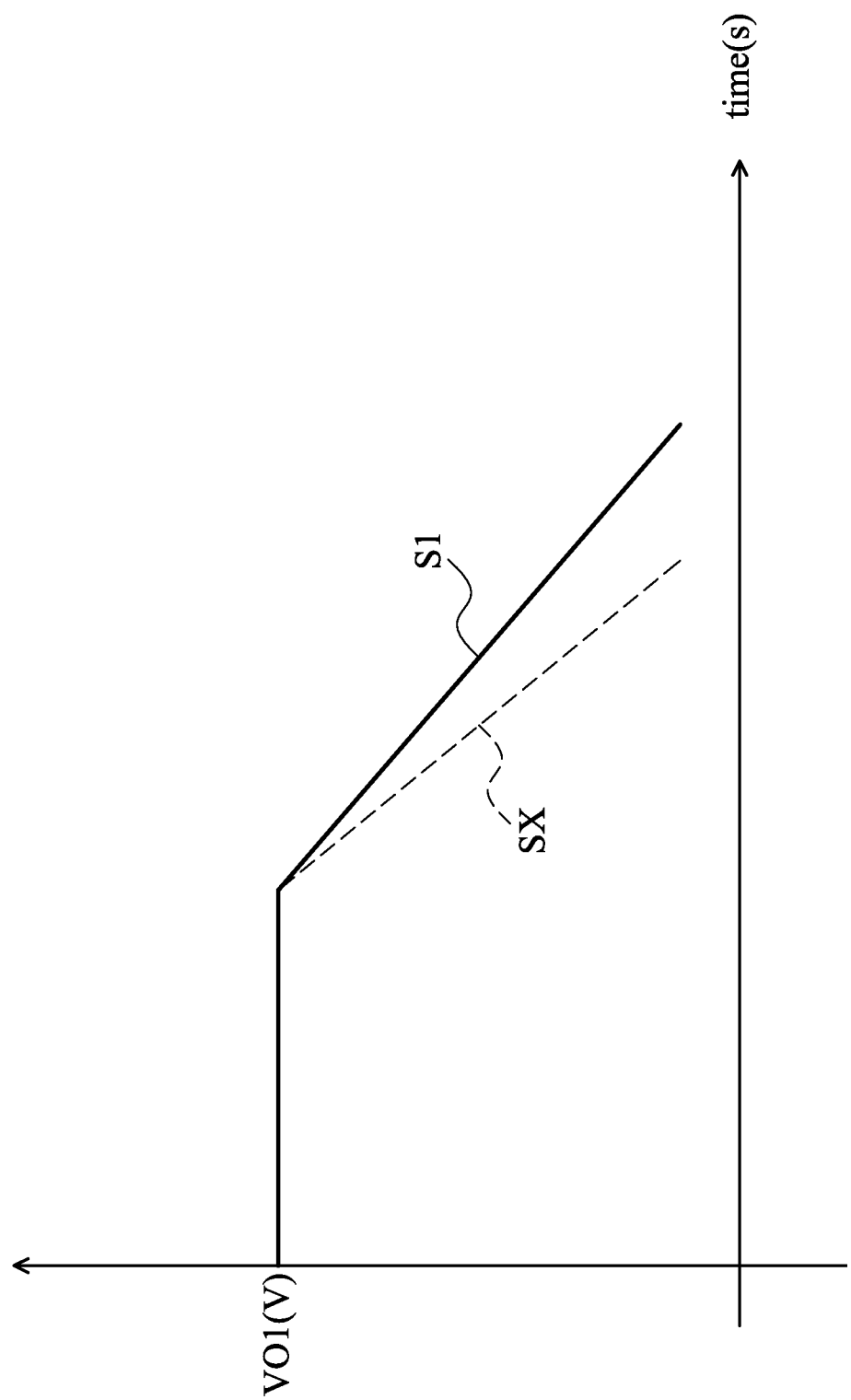
FIG. 4 is a waveform diagram of a first slope of a first output voltage and a reference slope according an embodiment of the present invention.

As shown in FIG. 3, when determining that the first slope S1 of the first output voltage VO1 is greater than the reference slope SX, it indicates that the voltage drop speed of the first output voltage VO1 is relatively fast, and the control module 170 generates the comparison result VS with a first voltage level. As shown in FIG. 4, when the first slope S1 of the first output voltage VO1 is less than the reference slope SX, it indicates that the voltage drop speed of the first output voltage VO1 is relatively slow, and the control module 170 generates the comparison result VS with a second voltage level. In the embodiment, the above first voltage level may be a high voltage level, such as 5V, and the above second voltage level may be a low voltage level, such as 0.1V, but the embodiment of the present invention is not limited thereto.

The logic module 180 is coupled to the control module 170 and the first output module 150. The logic module 180 receives the reference voltage VF, the first output voltage VO1 and the comparison result VS, and generates a logic signal LS according to the reference voltage VF, the first output voltage VO1 and the comparison result VS. Furthermore, the logic module 180 may determine whether the first output voltage VO1 is greater than the reference voltage VF, so as to generate an enabling signal. When determining that the first output voltage VO1 is greater than the reference voltage VF, the logic module 180 generates the enabling signal with the second voltage level (such as the low voltage level). Then, according to the enabling signal with the second voltage level (such as the low voltage level), the logic module 180 does not operate and does not generate the logic signal LS.

In addition, when determining that the first output voltage VO1 is not greater than the reference voltage VF, the logic module 180 generates the enabling signal with the first voltage level (such as the high voltage level). Then, according to the enabling signal with the first voltage level (such as the high voltage level), the logic module 180 performs a logical operation on the comparison result VS and the reference voltage VF, so as to generate the logic signal LS. In the embodiment, the above logical operation is, for example, an "AND" operation.

For example, when the comparison result VS and the reference voltage VF are both at the first voltage level (such as the high voltage level), the logic module 180 may generate the logic signal LS with a first logic level. When the comparison result VS is at the second voltage level (such as the low voltage level) and the reference voltage VF is at the first voltage level (such as the high voltage level), the logic module 180 may generate the logic signal LS with a second logic level. In the embodiment, the above first logic level may be a high logic level, such as "1", and the above second logic level may be a low logic level, such as "0", but the embodiment of the present invention is not limited thereto.

Then, the control module 170 controls the power supply device 100 to enter a short current protection or a under voltage protection according to the logic signal LS. For example, when the logic signal LS is at the first logic level (such as the high logic level), it indicates that the abnormality of the first output voltage VO1 is caused by a short current fault, and the control module 170 controls the power supply device 100 to enter the short current protection. When the logic signal LS is at the second logic level (such as the low logic level), it indicates that the abnormality of the first output voltage VO1 is caused by the under voltage fault, and the control module 170 controls the power supply device 100 to enter the under voltage protection.

Figure 5:
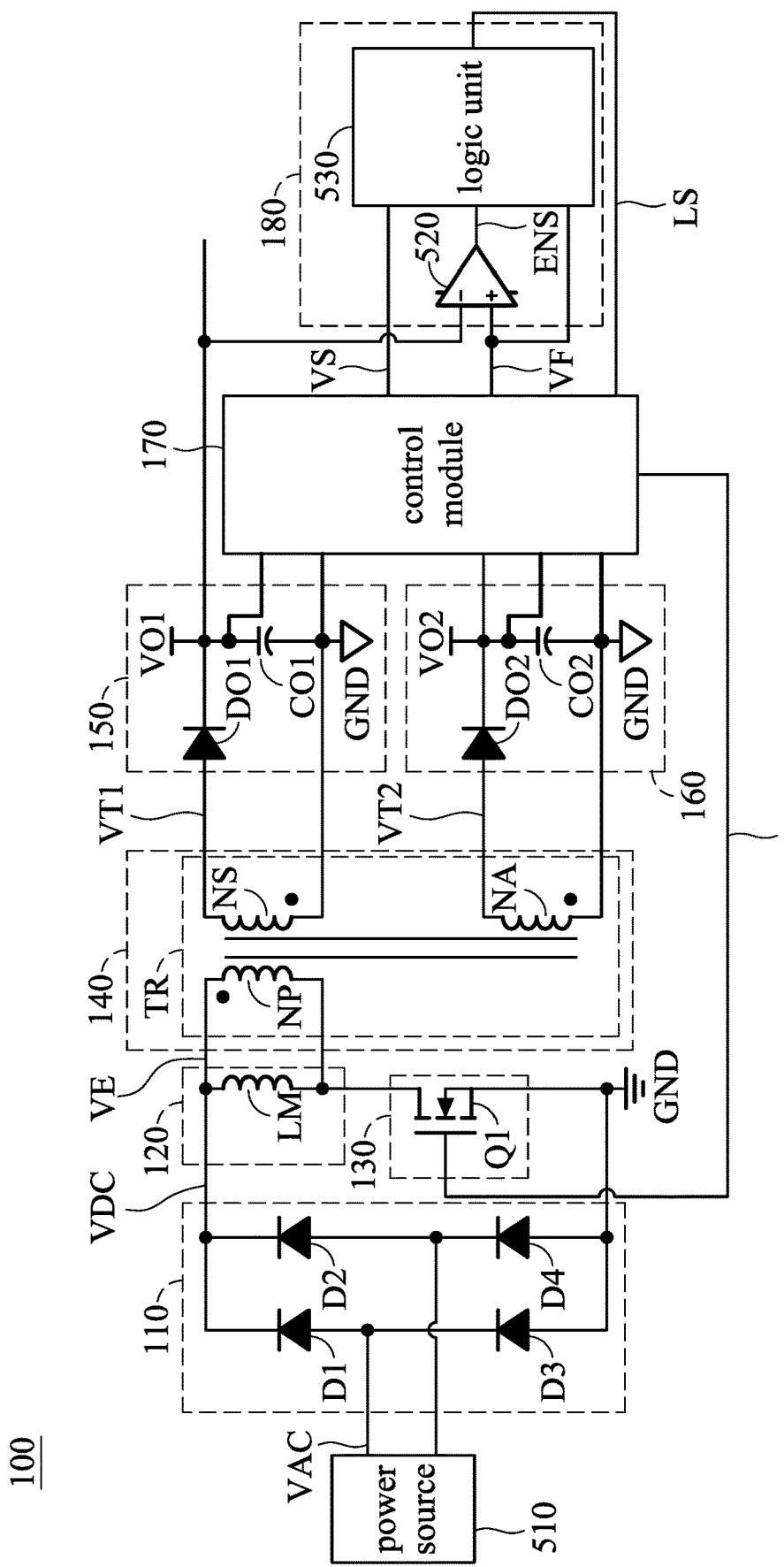
FIG. 5 is a detailed schematic view of a power supply device according an embodiment of the present invention.

FIG. 5 is a detailed schematic view of a power supply device according an embodiment of the present invention. Please refer to FIG. 5. The rectifier module 110 includes rectifier diodes D1, D2, D3 and D4. The rectifier diode D1 has a first terminal (such as an anode terminal) and a second terminal (such as a cathode terminal). The first terminal of the rectifier diode D1 is coupled to a first terminal of an alternating current power source 510 and receives the alternating current voltage VAC. The second terminal of the rectifier diode D1 generates the direct current voltage VDC. The rectifier diode D2 has a first terminal (such as an anode terminal) and a second terminal (such as a cathode terminal). The first terminal of the rectifier diode D2 is coupled to the second terminal of the alternating current power source 510. The second terminal of the rectifier diode D2 is coupled to the second terminal of the rectifier diode D1.

The rectifier diode D3 has a first terminal (such as an anode terminal) and a second terminal (such as a cathode terminal). The first terminal of the rectifier diode D3 is coupled to the ground terminal GND. The second terminal of the rectifier diode D3 is coupled to the first terminal of the rectifier diode D1. The rectifier diode D4 has a first terminal (such as an anode terminal) and a second terminal (such as a cathode terminal). The first terminal of the rectifier diode D4 is coupled to the ground terminal GND. The second terminal of the rectifier diode D4 is coupled to the first terminal of the rectifier diode D2.

The excitation module 120 includes an excitation inductor LM. The excitation inductor LM has a first terminal and a second terminal. The first terminal of the excitation inductor LM receives the direct current voltage VDC and generates the excitation voltage VE. The second terminal of the excitation inductor LM is coupled to the switch module 130 and the transformer module 140.

The switch module 130 includes a power switch Q1. The power switch Q1 has a first terminal, a second terminal and a control terminal. The first terminal of the power switch Q1 is coupled to the second terminal of the excitation inductor LM. The second terminal of the power switch Q1 is coupled to the ground terminal GND. The control terminal of the power switch Q1 is coupled to the control module 170 and receives the control signal CS. Furthermore, the power switch Q1 may determine whether to conduct or not according to the voltage level of the control signal CS.

For example, when the control terminal of the power switch Q1 receives the control signal CS with, for example, the high voltage level, the power switch Q1 may be conducted When the control terminal of the power switch Q1 receives the control signal CS with, for example, the low voltage level, the power switch Q1 may not be conducted. In the embodiment, the power switch Q1 may be, for example, an N-type transistor, wherein the first terminal of the power switch Q1 is, for example, a drain terminal of the N-type transistor, the second terminal of the power switch Q1 is, for example, a source terminal of the N-type transistor, and the control terminal of the power switch Q1 is, for example, a gate terminal of the N-type transistor, but the embodiment of the present invention is not limited thereto. In some embodiments, the power switch Q1 may also be a P-type transistor or another suitable transistor.

The transformer 140 includes a transformer TR. The transformer TR has a first terminal, a second terminal, a third terminal, a fourth terminal, a fifth terminal and a sixth terminal. The first terminal of the transformer TR is coupled to the first terminal of the excitation inductor LM. The second terminal of the transformer TR is coupled to the second terminal of the excitation inductor LM. The third terminal of the transformer TR generates the first transformed voltage VT1. The fourth terminal of the transformer TR is coupled to the ground terminal GND. The fifth terminal of the transformer TR generates the second transformed voltage VT2. The sixth terminal of the transformer TR is coupled to the ground terminal GND.

Furthermore, the transformer TR may include a primary side winding NP, a first secondary side winding NS and a second secondary side winding NA. The primary side winding NP has a first terminal and a second terminal. The first terminal of the primary side winding NP is coupled to the first terminal of the transformer TR. The second terminal of the primary side winding NP is coupled to the second terminal of the transformer TR. The first secondary side winding NS has a first terminal and a second terminal. The first terminal of the first secondary side winding NS is coupled to the third terminal of the transformer TR. The second terminal of the first secondary side winding NS is coupled to the fourth terminal of the transformer TR. The second secondary side winding NA has a first terminal and a second terminal. The first terminal of the second secondary side winding NA is coupled to the fifth terminal of the transformer TR. The second terminal of the second secondary side winding NA is coupled to the sixth terminal of the transformer TR.

The first output module 150 includes a first output diode DO1 and a first output capacitor. The first output diode DO1 has a first terminal (such as anode terminal) and a second terminal (such as a cathode terminal). The first terminal of the first output diode DO1 is coupled to the transformer module 140 (i.e., the third terminal of the transformer TR) and receives the first transformed voltage VT1. The second terminal of the first output diode DO1 generates the first output voltage VO1. The first output capacitor CO1 has a first terminal and a second terminal. The first terminal of the first output capacitor CO1 is coupled to the second terminal of the first output diode DO1. The second terminal of the first output capacitor CO1 is coupled to the ground terminal GND. In addition, the second terminal of the first output capacitor CO1 is also coupled to the fourth terminal of the transformer TR.

The second output module 160 includes a second output diode DO2 and a second output capacitor CO2. The second output diode DO2 has a first terminal (such as an anode terminal) and a second terminal (such as a cathode terminal). The first terminal of the second output diode DO2 is coupled to the transformer module 140 (i.e., the fifth terminal of the transformer TR) and receives the second transformed voltage VT2. The second terminal of the second output diode DO2 generates the second output voltage VO2. The second output capacitor CO2 has a first terminal and a second terminal. The first terminal of the second output capacitor CO2 is coupled to the second terminal of the second output diode DO2. The second terminal of the second output capacitor CO2 is coupled to a ground terminal GND. In addition, the second terminal of the second output capacitor CO2 is also coupled to the sixth terminal of the transformer TR.

The logic module 180 includes a comparator 520 and a logic unit 530. The comparator 210 is coupled to the first output module 150 (i.e., the second terminal of the first output diode DO1) and the control module 170. The comparator 520 receives the first output voltage VO1 and the reference voltage VF, and generate the enabling signal ENS according to the first output voltage VO1 and the reference voltage VF. For example, when determining that the first output voltage VO1 is greater than the reference voltage VF, the comparator 520 generates the enabling signal ENS with the second voltage level (such as the low voltage level). When determining that the first output voltage VO1 is not greater than the reference voltage VF, the comparator 520 generates the enabling signal ENS with the first voltage level (such as the high voltage level).

Furthermore, the comparator 520 includes a first input terminal (such as a negative input terminal), a second input terminal (such as a positive input terminal) and an output terminal. The first input terminal of the comparator 520 is coupled to the first output module 150 (i.e., the second terminal of the first output diode DO1) and receives the first output voltage VO1. The second input terminal of the comparator 520 is coupled to the control module 170 and receives the reference voltage VF. The output terminal of the comparator 520 generates the enabling signal ENS.

The logic unit 530 is coupled to the comparator 520 and the control module 170. The logic unit 530 receives the enabling signal ENS to determine whether the logic unit 530 is activated. In addition, the logic unit 530 receives the reference voltage VF and the comparison result VS, and generates the logic signal LS according to the reference voltage VF and the comparison result VS. For example, when the logic unit 530 receives the enabling signal ENS with the second voltage level (such as the low voltage level), the logic unit 530 is not activated and does not generate the logic signal LS.

When the logic unit 530 receives the enabling signal ENS with the first voltage level (such as the high voltage level), the logic unit 530 may be activated, and perform a logic operation (such as the "AND" operation) on the comparison result VS and the reference voltage VF, so as to generate the logic signal LS. For example, when the comparison result VS and the reference voltage VF are at the first voltage level (such as the high voltage level), the logic unit 530 may generate the logic signal LS with the first logic level (such as the high logic level). When the comparison result VS is at the second voltage level (such as the low voltage level) and the reference voltage VF is at the first voltage level (such as the high voltage level), the logic unit 530 may generate the logic signal LS with the second logic level (such as the low logic level).

Furthermore, the logic unit 530 includes a power source terminal, a first input terminal, a second input terminal and an output terminal. The power source terminal of the logic unit 530 is coupled to the output terminal of the comparator 520 and receives the enabling signal ENS. The first input terminal of the logic unit 530 is coupled to the control module 170 and receives the comparison result VS. The second input terminal of the logic unit 530 is coupled to the control module 170 and receives the reference voltage VF. The output terminal of the logic unit 530 generates the logic signal LS. In some embodiments, the logic unit 530 is, for example, an AND gate, so as to perform an "AND" operation on the signals received by the first input terminal and the second input terminal.

In an entire operation of the power supply device 100, the control module 170 generates the control signal CS, so that the power switch Q1 (i.e., the switch module 130) performs the switching operation for conducting or non-conducting. Then the excitation module 120 receives the direct current voltage VDC to generate the excitation voltage VE. Afterward, the transformer module 140 receives the excitation voltage VE to generate the first transformed voltage VT1 and the second transformed voltage VT2. Then, the first output module 150 and the second output module 160 respectively receive the first transformed voltage VT1 and the second transformed voltage VT2, so as to generate the first output voltage VO1 and the second output voltage VO2.

Afterward, the control module 170 receives the first output voltage VO1 and the second output voltage VO2, and obtain the first slope of the first output voltage VO1 and the second slope of the second output voltage VO2. Then, the control module 170 determines whether the first slope of the first output voltage VO1 is the same as the second slope of the second output voltage VO2, so as to determine whether the first output voltage VO1 is abnormal.

As shown in FIG. 2, when determining that the first slope of the first output voltage VO1 is the same as the second slope of the second output voltage VO2, the control module 170 determines that the first output voltage VO1 is not abnormal, and the control module 170 does not generate the comparison result VS, so that the power supply device 100 operates normally.

On the other hand, when determining that the first slope of the first output voltage VO1 is not the same as the second slope of the second output voltage VO2, the control module 170 determines that the first output voltage VO1 is abnormal. Then, the control module 170 may determine whether the first slope of the first output voltage VO1 is greater than or less then the reference slope.

As shown in FIG. 3, when determining that the first slope S1 of the first output voltage VO1 is greater than the reference slope SX, it indicates that the voltage drop speed of the first output voltage VO1 is relatively fast, and the control module 170 generates the comparison result VS with the first voltage level (such as the high voltage level).

Then, the comparator 520 may compare whether the first output voltage VO1 is greater than the reference voltage VF. When the first output voltage VO1 is greater than the reference voltage VF, the comparator 520 generates the enabling signal ENS with the second voltage level (such as the low voltage level). Afterward, when the logic unit 530 receives the enabling signal ENS with the second voltage level (such as the low voltage level), the logic unit 530 is not activated and does not generate the logic signal LS. That is, the control module 170 may not receive the logic signal LS, so that the power supply device 100 does not enter the protection and maintains the normal operation.

When the first output voltage VO1 is not greater than the reference voltage VF, the comparator 520 generates the enabling signal ENS with the first voltage level (such as the high voltage level). Afterward, when the logic unit 530 receives the enabling signal ENS with the first voltage level (such as the high voltage level), the logic unit 530 may be activated, and perform the "AND" operation on the comparison result VS with the first voltage level (such as the high voltage level) and the reference voltage VF with the first voltage level (such as the high voltage level), so as to generate the logic signal LS with the first logic level (such as the high logic level). Then, when the control module 170 receives the logic signal LS with the first logic level (such as the high logic level), it indicates that the abnormality of the first output voltage VO1 is caused by the short current fault, and the control module 170 controls the power supply device 100 to enter the short current protection.

Continued to that the control module 170 may determines whether the first slope of the first output voltage VO1 is greater than or less than the reference slope, as shown in FIG. 4, when the first slope S1 of the first output voltage VO1 is less than the reference slope SX, it indicates that the voltage drop speed of the first output voltage VO1 is relatively slow, and the control module 170 generates the comparison result VS with the second voltage level (such as the low voltage level).

Then, the comparator 520 may compare whether the first output voltage VO1 is greater than the reference voltage VF. When the first output voltage VO1 is greater than the reference voltage VF, the comparator 520 generates the enabling signal ENS with the second voltage level (such as the low voltage level). Afterward, when the control unit 530 receives the enabling signal ENS with the second voltage level (such as the low voltage level), the logic unit 530 is not activated and does not generate the logic signal LS. That is, the control module 170 may not receive the logic signal LS, so that the power supply device 100 does not enter the protection and maintains the normal operation.

When the first output voltage VO1 is not greater than the reference voltage VF, the comparator 520 generates the enabling signal ENS with the first voltage level (such as the high voltage level). Afterward, when the logic unit 530 receives the enabling signal ENS with the first voltage level (such as the high voltage level), the logic unit 530 may be activated, and perform the "AND" operation on the comparison result VS with the second voltage level (such as the low voltage level) and the reference voltage VF with the first voltage level (such as the high voltage level), so as to generate the logic signal LS with the second logic level (such as the low logic level). Then, when the control module 170 receives the logic signal LS with the second logic level (such as the low logic level), it indicates that the abnormality of the first output voltage VO1 is caused by the under voltage fault, and the control module 170 controls the power supply device 100 to enter the under voltage protection.

Figure 6:
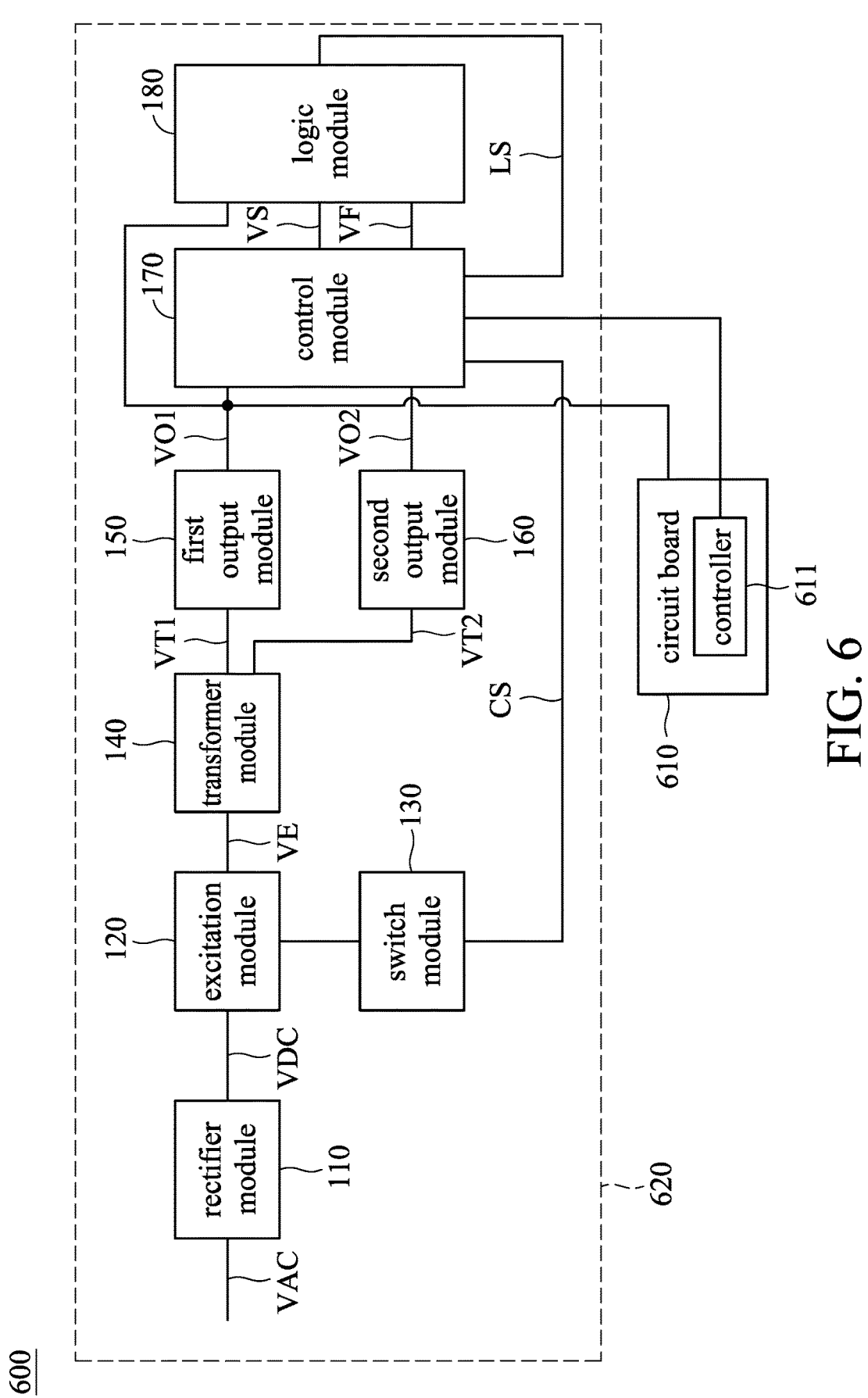
FIG. 6 is a schematic view of an electronic device according an embodiment of the present invention.

FIG. 6 is a schematic view of an electronic device according an embodiment of the present invention. In the embodiment, the electronic device 600 may be a notebook computer or a personal computer, etc., but the embodiment of the present invention is not limited thereto. Please refer to FIG. 6. The electronic device 600 includes a circuit board 610 and a power supply device 620. The circuit board 610 includes a controller 611. In the embodiment, the circuit board 610 may be a motherboard (MB), and the controller 611 may be an embedded controller (EC).

The power supply device 620 is coupled to the circuit board 610. The power supply device 620 includes a rectifier module 110, an excitation module 120, a switch module 130, a transformer module 140, a first output module 150, a second output module 160, a control module 170 and a logic module 180. In the embodiment, the rectifier module 110, the excitation module 120, the switch module 130, the transformer module 140, the first output module 150, the second output module 160, the control module 170 and the logic module 180 of the power supply device 620 are the same as or similar to the rectifier module 110, the excitation module 120, the switch module 130, the transformer module 140, the first output module 150, the second output module 160, the control module 170 and the logic module 180 in FIG. 1 or FIG. 5. Accordingly, the rectifier module 110, the excitation module 120, the switch module 130, the transformer module 140, the first output module 150, the second output module 160, the control module 170 and the logic module 180 of the power supply device 620 may refer to the description of the embodiment of FIG. 1 or FIG. 5, and the description thereof is not limited thereto.

In the embodiment, the power supply device 620 may provide the first output voltage VO1 to the circuit board 610 for operation of the circuit board 610. When the control module 170 of the power supply device 620 determines that the first output voltage VO1 is abnormal, the control module 170 may generate an abnormal signal to the controller 611, so that the controller 611 knows an abnormality occurs in the power supply device 620. In some embodiments, the control module 170 generates a message corresponding to the short current protection or the under voltage protection to the controller 611 according to the logic signal LS. That is, when the control module 170 receives the logic signal LS with the first logic level (such as the high logic level), the control module 170 may control the power supply device 620 to enter the short current protection, and generate the message corresponding to the short current protection to the controller 611, so that the controller 611 knows that the power supply device 620 has entered the short current protection. When the control module 170 receives the logic signal LS with the second logic level (such as the low logic level), the control module 170 may control the power supply device 620 to enter the under voltage protection, and generate the message corresponding to the under voltage protection to the controller 611, so that the controller 611 knows that the power supply device 620 has entered the under voltage protection. In some embodiments, the reference slope in the control module 170 may be set or adjusted through the controller 611.

In summary, according to the power supply device and the electronic device disclosed by the embodiment of the present invention, the control module determines whether the first output voltage is abnormal according to the first slope of the first output voltage and the second slope of the second output voltage, and when the first output voltage is abnormal, the control module generates the comparison result according to the first slope of the first output voltage and the reference slope. Then, the logic module generates the logic signal according to the first output voltage, the reference voltage and the comparison result. Afterward, the control module controls the power supply device to enter the short current protection or the under voltage protection according to the logic signal. Therefore, it may effectively determine the type of abnormality (the short current or the under voltage) present in the first output voltage, so that the power supply device may enter the corresponding protection mode (short current protection or under voltage protection). The convenience of use is thereby increased.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A power supply device, comprising:
   a rectifier module, configured to receive an alternating current voltage, and to transform the alternating current voltage into a direct current voltage;
   an excitation module, coupled to the rectifier module, and configured to receive the direct current voltage to generate an excitation voltage;
   a switch module, coupled to the excitation module, and configured to determine whether to conduct or not according to a control signal;
   a transformer module, coupled to the excitation module, and configured to receive the excitation voltage to generate a first transformed voltage and a second transformed voltage;
   a first output module, coupled to the transformer module, and configured to receive the first transformed voltage to generate a first output voltage;
   a second output module, coupled to the transformer module, and configured to receive the second transformed voltage to generate a second output voltage;
   a control module, coupled to the switch module, the first output module and the second output module, wherein the control module is configured to generate the control signal and a reference voltage, receive the first output voltage and the second output voltage, determine whether the first output voltage is abnormal according to a first slope of the first output voltage and a second slope of the second output voltage, and generate a comparison result according to the first slope and a reference slope when determining that the first output voltage is abnormal; and
   a logic module, coupled to the control module and the first output module, and configured to receive the reference voltage, the first output voltage and the comparison result, and generate a logic signal according to the reference voltage, the first output voltage and the comparison result;
   wherein the control module is configured to control the power supply device to enter a short current protection or a under voltage protection according to the logic signal.

2. The power supply device as claimed in claim 1, wherein the control module determines whether the first slope is the same as the second slope to determine whether the first output voltage is abnormal, when determining that the first slope is the same as the second slope, the control module determines that the first output voltage is not abnormal, and the control module does not generate the comparison result, when determining that the first slope is not the same as the second slope, the control module determines that the first output voltage is abnormal, and the control module determines whether the first slope is greater than or less than the reference slope, when determining that the first slope is greater than the reference slope, the control module generates the comparison result with a first voltage level, and when determining that the first slope is less than the reference slope, the control module generates the comparison result with a second voltage level.

3. The power supply device as claimed in claim 1, wherein the rectifier module comprises a bridge rectifier.

4. The power supply device as claimed in claim 1, wherein the excitation module comprises:
   an excitation inductor, having a first terminal and a second terminal, wherein the first terminal of the excitation inductor receives the direct current voltage and generates the excitation voltage, and the second terminal of the excitation inductor is coupled to the switch module and the transformer module.

5. The power supply device as claimed in claim 4, wherein the switch module comprises:
   a power switch, having a first terminal, a second terminal and a control terminal, wherein the first terminal of the power switch is coupled to the second terminal of the excitation inductor, the second terminal of the power switch is coupled to a ground terminal, and the control terminal of the power switch is coupled to the control module and receives the control signal.

6. The power supply device as claimed in claim 4, wherein the transformer module comprises:
   a transformer, having a first terminal, a second terminal, a third terminal, a fourth terminal, a fifth terminal and a sixth terminal, wherein the first terminal of the transformer is coupled to the first terminal of the excitation inductor, the second terminal of the transformer is coupled to the second terminal of the excitation inductor, the third terminal of the transformer generates the first transformed voltage, the fourth terminal of the transformer is coupled to a ground terminal, the fifth terminal of the transformer generates the second transformed voltage, and the sixth terminal of the transformer is coupled to the ground terminal.

7. The power supply device as claimed in claim 1, wherein the first output module comprises:
   a first output diode, having a first terminal and a second terminal, wherein the first terminal of the first output diode is coupled to the transformer module and receives the first transformed voltage, and the second terminal of the first output diode generates the first output voltage; and
   a first output capacitor, having a first terminal and a second terminal, wherein the first terminal of the first output capacitor is coupled to the second terminal of the first output diode, and the second terminal of the first output capacitor is coupled to a ground terminal.

8. The power supply device as claimed in claim 1, wherein the second output module comprises:
   a second output diode, having a first terminal and a second terminal, wherein the first terminal of the second output diode is coupled to the transformer module and receives the second transformed voltage, and the second terminal of the second output diode generates the second output voltage; and
a second output capacitor, having a first terminal and a second terminal, wherein the first terminal of the second output capacitor is coupled to the second terminal of the second output diode, and the second terminal of the second output capacitor is coupled to a ground terminal.

9. The power supply device as claimed in claim 1, wherein the logic module comprises:
a comparator, coupled to the first output module and the control module, and configured to receive the first output voltage and the reference voltage, and generate an enabling signal according to the first output voltage and the reference voltage; and
a logic unit, coupled to the comparator and the control module, wherein the logic unit is configured to receive the enabling signal to determine whether the logic unit is activated, and the logic unit receives the reference voltage and the comparison result, and generates the logic signal according to the reference voltage and the comparison result.

10. An electronic device, comprising:
a circuit board, comprising a controller; and
a power supply device as claimed in claim 1, coupled to the circuit board;
wherein the power supply device provides the first output voltage to the circuit board for operation of the circuit board;
wherein when the control module of the power supply device determines that the first output voltage is abnormal, the control module generates an abnormal signal to the controller;
wherein the control module generates a message corresponding to the short current protection or the under voltage protection to the controller according to the logic signal;
wherein the reference slope is set or adjusted through the controller.

11. The electronic device as claimed in claim 10, wherein the control module determines whether the first slope is the same as the second slope to determine whether the first output voltage is abnormal, when determining that the first slope is the same as the second slope, the control module determines that the first output voltage is not abnormal, and the control module does not generate the comparison result, when determining that the first slope is not the same as the second slope, the control module determines that the first output voltage is abnormal, and the control module determines whether the first slope is greater than or less than the reference slope, when determining that the first slope is greater than the reference slope, the control module generates the comparison result with a first voltage level, and when determining that the first slope is less than the reference slope, the control module generates the comparison result with a second voltage level.

12. The electronic device as claimed in claim 10, wherein the rectifier module comprises a bridge rectifier.

13. The electronic device as claimed in claim 10, wherein the excitation module comprises:
an excitation inductor, having a first terminal and a second terminal, wherein the first terminal of the excitation inductor receives the direct current voltage and generates the excitation voltage, and the second terminal of the excitation inductor is coupled to the switch module and the transformer module.

14. The electronic device as claimed in claim 13, wherein the switch module comprises:
a power switch, having a first terminal, a second terminal and a control terminal, wherein the first terminal of the power switch is coupled to the second terminal of the excitation inductor, the second terminal of the power switch is coupled to a ground terminal, and the control terminal of the power switch is coupled to the control module and receives the control signal.

15. The electronic device as claimed in claim 13, wherein the transformer module comprises:
a transformer, having a first terminal, a second terminal, a third terminal, a fourth terminal, a fifth terminal and a sixth terminal, wherein the first terminal of the transformer is coupled to the first terminal of the excitation inductor, the second terminal of the transformer is coupled to the second terminal of the excitation inductor, the third terminal of the transformer generates the first transformed voltage, the fourth terminal of the transformer is coupled to a ground terminal, the fifth terminal of the transformer generates the second transformed voltage, and the sixth terminal of the transformer is coupled to the ground terminal.

16. The electronic device as claimed in claim 10, wherein the first output module comprises:
a first output diode, having a first terminal and a second terminal, wherein the first terminal of the first output diode is coupled to the transformer module and receives the first transformed voltage, and the second terminal of the first output diode generates the first output voltage; and
a first output capacitor, having a first terminal and a second terminal, wherein the first terminal of the first output capacitor is coupled to the second terminal of the first output diode, and the second terminal of the first output capacitor is coupled to a ground terminal.

17. The electronic device as claimed in claim 10, wherein the second output module comprises:
a second output diode, having a first terminal and a second terminal, wherein the first terminal of the second output diode is coupled to the transformer module and receives the second transformed voltage, and the second terminal of the second output diode generates the second output voltage; and
a second output capacitor, having a first terminal and a second terminal, wherein the first terminal of the second output capacitor is coupled to the second terminal of the second output diode, and the second terminal of the second output capacitor is coupled to a ground terminal.

18. The electronic device as claimed in claim 10, wherein the logic module comprises:
a comparator, coupled to the first output module and the control module, and configured to receive the first output voltage and the reference voltage, and generate an enabling signal according to the first output voltage and the reference voltage; and
a logic unit, coupled to the comparator and the control module, wherein the logic unit is configured to receive the enabling signal to determine whether the logic unit is activated, and the logic unit receives the reference voltage and the comparison result, and generates the logic signal according to the reference voltage and the comparison result.

* * * * *